US012334099B2

(12) United States Patent
Chen et al.

(10) Patent No.: US 12,334,099 B2
(45) Date of Patent: Jun. 17, 2025

(54) EFFICIENT BLIND SOURCE SEPARATION USING TOPOLOGICAL APPROACH

(71) Applicant: HARMAN INTERNATIONAL INDUSTRIES, INCORPORATED, Stamford, CT (US)

(72) Inventors: Liangfu Chen, Shanghai (CN); Zhilei Liu, Shanghai (CN); Guoxia Zhang, Shanghai (CN); Min Xu, Shanghai (CN)

(73) Assignee: Harman International Industries, Incorporated, Stamford, CT (US)

( * ) Notice: Subject to any disclaimer, the term of this patent is extended or adjusted under 35 U.S.C. 154(b) by 297 days.

(21) Appl. No.: 17/923,884

(22) PCT Filed: May 15, 2020

(86) PCT No.: PCT/CN2020/090491
§ 371 (c)(1),
(2) Date: Nov. 7, 2022

(87) PCT Pub. No.: WO2021/226999
PCT Pub. Date: Nov. 18, 2021

(65) Prior Publication Data
US 2023/0223036 A1 Jul. 13, 2023

(51) Int. Cl.
*G10L 21/0308* (2013.01)
*G10L 21/14* (2013.01)
(Continued)

(52) U.S. Cl.
CPC .......... *G10L 21/0308* (2013.01); *G10L 21/14* (2013.01); *G10L 25/18* (2013.01);
(Continued)

(58) Field of Classification Search
CPC . G10L 21/0308; G10L 21/0272; G10L 21/14; G10L 25/18; G10L 21/0208;
(Continued)

(56) References Cited

U.S. PATENT DOCUMENTS

| | | | |
|---|---|---|---|
| 6,430,528 | B1 | 8/2002 | Jourjine et al. |
| 8,958,750 | B1 | 2/2015 | Saleem et al. |

(Continued)

FOREIGN PATENT DOCUMENTS

| | | | |
|---|---|---|---|
| CN | 103733602 | A | 4/2014 |
| CN | 110111806 | A | 8/2019 |

(Continued)

OTHER PUBLICATIONS

International Search Report dated Feb. 20, 2021 for PCT Appn. No. PCT/CN2020/090491 filed May 15, 2020, 10 pgs.

(Continued)

*Primary Examiner* — Yogeshkumar Patel
(74) *Attorney, Agent, or Firm* — Brooks Kushman P.C.

(57) ABSTRACT

Aspects disclosed herein generally related to a method and system for efficient blind source separation using a topological approach. The method and system comprise locating and separating the audio streams by constructing and simplifying contour tree in a built time-frequency smooth weighted histogram in the subsystems included. Thus, in one example, the audio streams can be separated and reproduced in a faster, more reliability, higher quality and more robust way.

20 Claims, 6 Drawing Sheets

(51) Int. Cl.

| | |
|---|---|
| ***G10L 25/18*** | (2013.01) |
| ***H04R 1/40*** | (2006.01) |
| ***H04R 3/00*** | (2006.01) |
| ***H04R 3/12*** | (2006.01) |

(52) U.S. Cl.
CPC .............. *H04R 1/406* (2013.01); *H04R 3/005* (2013.01); *H04R 3/12* (2013.01)

(58) Field of Classification Search
CPC ..... G10L 21/0232; H04R 1/406; H04R 3/005; H04R 3/12
See application file for complete search history.

(56) References Cited

U.S. PATENT DOCUMENTS

| | | | | |
|---|---|---|---|---|
| 9,554,203 | B1 * | 1/2017 | Pavlidi | H04R 1/08 |
| 2003/0233227 | A1 | 12/2003 | Rickard, Jr. et al. | |
| 2006/0058983 | A1 | 3/2006 | Araki et al. | |
| 2009/0268962 | A1 * | 10/2009 | Fearon | G06F 18/2134 704/200 |
| 2012/0275271 | A1 * | 11/2012 | Claussen | G01S 3/8006 367/118 |
| 2014/0226838 | A1 * | 8/2014 | Wingate | G10L 21/0272 381/111 |
| 2017/0178664 | A1 * | 6/2017 | Wingate | G10L 21/028 |
| 2018/0083656 | A1 * | 3/2018 | Ray | H04B 1/0053 |
| 2020/0167602 | A1 * | 5/2020 | Betts | H03H 21/0027 |

FOREIGN PATENT DOCUMENTS

| | | |
|---|---|---|
| CN | 110807524 A | 2/2020 |
| CN | 110956978 A | 4/2020 |
| CN | 111133511 A | 5/2020 |

OTHER PUBLICATIONS

Rickard, S., "The DUET Blind Source Separation Algorithm", Blind Speech Separation, Jan. 2007, 26 pgs.

* cited by examiner

RAW Distribution

Smoothed Distribution

EFFICIENT BLIND SOURCE SEPARATION USING TOPOLOGICAL APPROACH

CROSS-REFERENCE TO RELATED APPLICATION

This application is the U.S. national phase of PCT Application No. PCT/CN2020/090491 filed on May 15, 2020, the disclosure of which is hereby incorporated in its entirety by reference herein.

TECHNICAL FIELD

Embodiments disclosed herein generally relate to blind source separation in speech processing and recognition. More particularly, the present disclosure relates to a method for efficient blind source separation using a topological approach. The present disclosure also relates to a system for efficient blind source separation using a topological approach.

BACKGROUND

Nowadays, signal separation is frequently used by general users in many occasions. In an acoustic domain, it is often desirable to separate a single voice or audio stream from the background or other voices received. To separate multiple sound sources from mixtures, the algorithm of Degenerate Unmixing Estimation Technique (DUET) is generally used for blind signal separation (BSS), which can roughly separate any number of sources using only two mixtures. For anechoic mixtures of attenuated and delayed sources, the DUET algorithm allows one to estimate the mixing parameters by clustering relative attenuation-delay pairs extracted from the ratios of the time-frequency representations of the mixtures. The estimates of the mixing parameters are then used to partition the time-frequency representation of one mixture to recover the original sources.

However, the traditional DUET in blind source separation suffers from various issues such as reliability, accuracy, and efficiency. Every time the DUET algorithm processes an audio stream for blind source separation, a k-means algorithm is used for clustering audio streams in the time-frequency space, which generates random value as an initial guest for predicting the peak points in the time-frequency space. Therefore, the result of the output is not reproducible, and sometimes is inaccurate, either. In addition, the k-means algorithm tries to estimate the center of a cluster instead of the peak location of the cluster, which may result in a shifted version of predicted peak points in the time-frequency space, and leads to the blind source separation results can't be always reliable.

Therefore, there may be a need to improve the source separation technique, so as to process the audio streams in a faster, more reliability, higher quality and more robust way.

SUMMARY

The present disclosure, for example, overcomes some of the drawbacks by providing a method and system for efficient blind source separation using a topological approach.

A method for efficient blind source separation using a topological approach is disclosed. The method comprising: receiving, in at least two microphones, mixtures comprising at least two mixed audio streams; converting, in a first subsystem, the mixtures to time-frequency space features, and constructing a two-dimensional smoothed weighted histogram; separating, in a second subsystem, the at least two mixed audio streams by locating peak locations in the two-dimensional smoothed weighted histogram; and recovering, in a third subsystem, the at least two separated audio streams, respectively, wherein locating the peak locations further comprises the steps of: constructing a contour tree in the two-dimensional smoothed weighted histogram; and simplifying the contour tree structures.

A system for efficient blind source separation using a topological approach is disclosed. The system comprises at least two microphones for receiving mixtures comprising at least mixed first and second audio streams; a first subsystem for converting said mixtures to time-frequency space features, and constructing a two-dimensional smoothed weighted histogram; a second subsystem for separating the first audio stream and the second audio stream by locating peak locations in the two-dimensional smoothed weighted histogram; and a third subsystem for recovering the first audio stream and the second stream, respectively. For locating the peak locations in the second subsystem, the second subsystem further comprises the steps of constructing a contour tree in the two-dimensional smoothed weighted histogram; and simplifying the contour tree structures.

A non-transitory computer-readable storage medium storing instructions that, when executed by a processor, configure the processor to perform receiving, in at least two microphones, mixtures comprising at least two mixed audio streams and converting, in a first subsystem, the mixtures to time-frequency space features, and constructing a two-dimensional smoothed weighted histogram. The non-transitory computer-readable storage medium storing instructions that, when executed by the processor, configure the processor to perform separating, in a second subsystem, the at least two mixed audio streams by locating peak locations in the two-dimensional smoothed weighted histogram to provide at least two separated audio streams; and recovering, in a third subsystem, the at least two separated audio streams, respectively. The locating the peak locations further comprises constructing a contour tree structure in the two-dimensional smoothed weighted histogram, and simplifying the contour tree structure.

BRIEF DESCRIPTION OF THE DRAWINGS

The present disclosure may be better understood from reading the following description of non-limiting embodiments, with reference to the attached drawings. In the figures, like reference numerals designates corresponding parts, wherein.

DETAILED DESCRIPTION

The detailed description of the embodiments is disclosed hereinafter; however, it is understood that the disclosed embodiments are merely exemplary that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
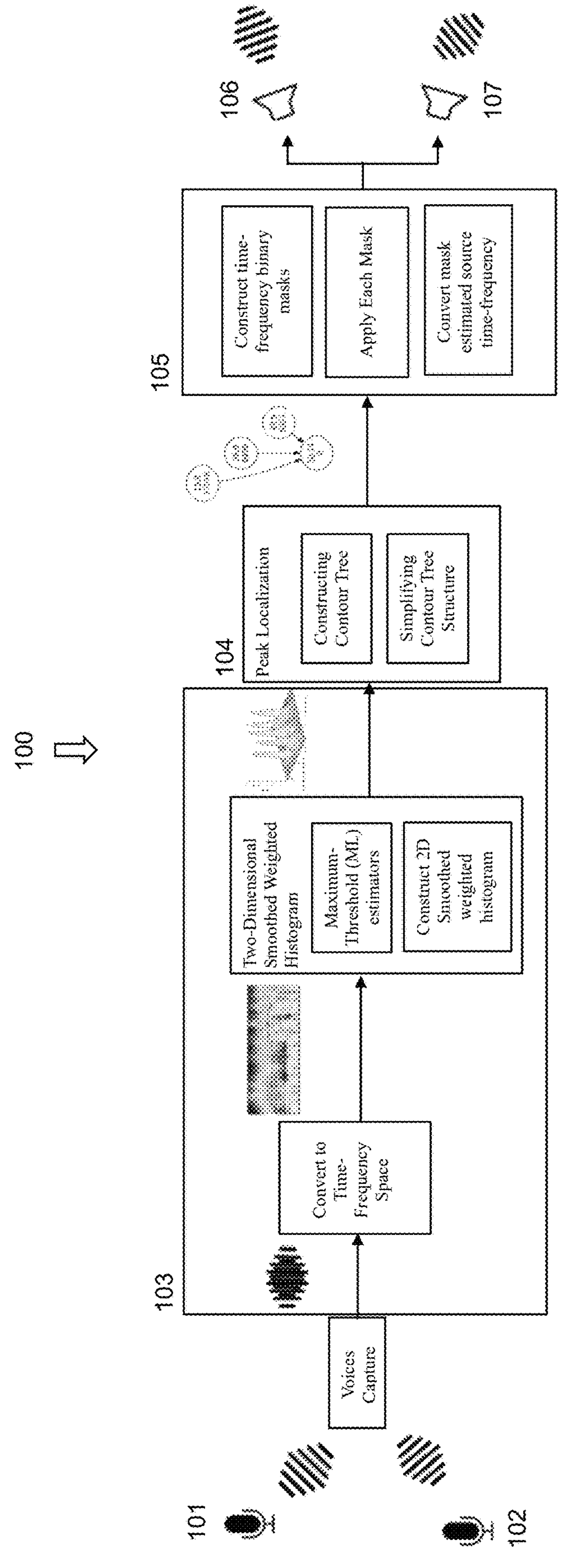
FIG. 1 is a schematic diagram illustrating an overview system according to an embodiment.

A system is provided to improve the efficiency of blind source separation (BSS) using a topological approach in audio processing. FIG. 1 shows a schematic diagram illustrating the overview system according to an embodiment of the present disclosure. As shown in FIG. 1, the provided system 100 may comprise the following components: a pair of microphones 101, 102 for receiving the mixtures of two source mixtures; a first subsystem 103 for converting the mixed audio streams to time-frequency space features and constructing a two-dimensional smoothed weighted histogram; a second subsystem 104 for constructing a contour tree from the converted histogram, and simplifying the contour tree structure in locating peak locations, and a third subsystem 105 for recovering separated audio streams with the located peaks. The system 100 may further include two or more loudspeakers 106, 107 to playback the audio streams.

In the embodiment as shown in FIG. 1, the pair of microphones 101, 102 are used to capture the audio mixtures of two source mixtures $s_j(t)$, j=[1,2]. The received audio mixtures may include a mixed first audio stream $x_1(t)$, and a mixed second audio stream $x_2(t)$. Consider the mixtures of two source mixtures $s_j(t)$, j=[1,2] are received at the two microphones 101, 102, respectively, where only the direct path is present. In this case, without loss of generality, the attenuation and delay parameters of the first mixture $x_1(t)$ can be absorbed into the definition of the sources, and the second mixture $x_2(t)$ can then be defined relatively. Thus, the two anechoic mixtures can be expressed as:

$$x_1(t)=\Sigma_{j=1}N\ s_j(t) \tag{1}$$

$$x_2(t)=\Sigma_{j=1}N\ a_j s_j(t-\delta_j) \tag{2}$$

where N is the number of sources, $\delta_j$ is the arrival delay between the tensors, and $a_j$ is a relative attenuation factor corresponding to the ratio of the attenuation of the paths between sources and sensors.

The above received mixtures can be converted in to the time-frequency space, for example by the Fourier transform. The assumption of anechoic mixing and local stationary allow us to rewrite the mixing equations above in the time-frequency domain as the following:

$$\begin{bmatrix}\widehat{x_1}(\tau,\omega)\\ \widehat{x_2}(\tau,\omega)\end{bmatrix}=\begin{bmatrix}1 & \dots & 1\\ a_1e-i\omega\sigma_1 & \dots & a_Ne-i\omega\sigma_N\end{bmatrix}\begin{bmatrix}\widehat{s_1}(\tau,\omega)\\ \vdots\\ \vdots\\ \widehat{s_N}(\tau,\omega)\end{bmatrix} \tag{3}$$

Wherein $\widehat{x_1}(\tau, \omega)$, $\widehat{x_2}(\tau, \omega)$ and $\widehat{s_N}(\tau, \omega)$ in the time-frequency space are corresponding to $x_1(t)$, $x_2(t)$ and $s_j(t)$ in the time domain, respectively.

In order to account for the fact that our assumptions made previously will not be satisfied in a strict sense, a mechanism may be needed for clustering the relative attenuation-delay estimates. For the above expression, the maximum-likelihood (ML) estimators may be considered for $a_j$ and $\delta_j$ in the following mixing model:

$$\begin{bmatrix}\hat{x}_1(\tau,\omega)\\ \hat{x}_2(\tau,\omega)\end{bmatrix}=\begin{bmatrix}1\\ a_je^{-i\omega\sigma_j}\end{bmatrix}\hat{s_J}(\tau,\omega)+\begin{bmatrix}\hat{n}_1(\tau,\omega)\\ \hat{n}_2(\tau,\omega)\end{bmatrix},\ \forall\ (\tau,\omega)\in\Omega_j \tag{4}$$

where $\hat{n}_1$ and $\hat{n}_2$ are noise terms which represent the assumption inaccuracies.

Figure 2:
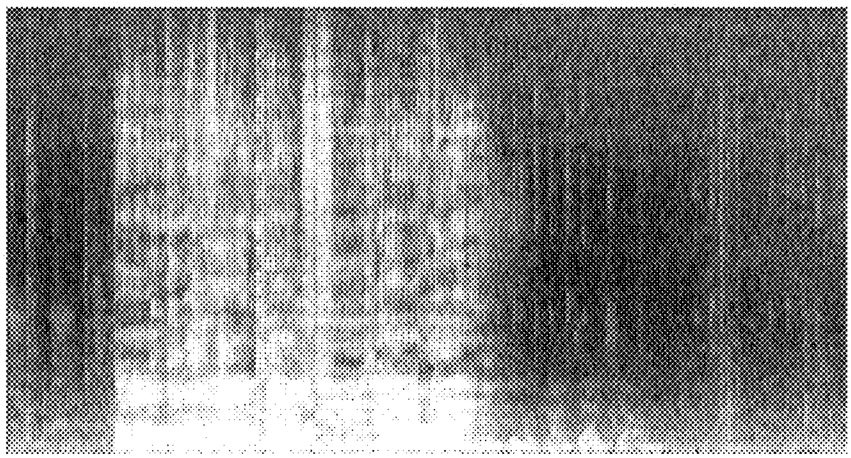
FIG. 2 is an example of acoustic features in the time-frequency space.

In this stage, the time-frequency representations $\widehat{x_1}(\tau, \omega)$ and $\widehat{x_2}(\tau, \omega)$ have been constructed from the mixtures $x_1(t)$ and $x_2(t)$, wherein $x_1(t)$ and $x_2(t)$ are the received mixed voice signals, have been constructed. FIG. 2 shows an example of a voice time-frequency analysis chart representing the converted audio mixtures in the time-frequency space, which provides the joint distribution information of the time domain and the frequency domain.

Accordingly, the relative attenuation-delay pairs can be calculated as:

$$\left(\left[\frac{\widehat{x_2}(\tau,\omega)}{\widehat{x_1}(\tau,\omega}\right]-\left[\frac{\widehat{x_1}(\tau,\omega)}{\widehat{x_2}(\tau,\omega)}\right],\ \frac{-1}{\omega}\angle\left(\frac{\widehat{x_2}(\tau,\omega)}{\widehat{x_1}(\tau,\omega}\right)\right) \tag{5}$$

Based on the above calculated relative attenuation-delay pairs, a weighted histogram of both the direction-of-arrivals (DOAs) and the distances can be formed from the mixtures which are observed using two microphones.

With defining the set of points which will contribute to a given location in the histogram as:

$$I(\alpha,\delta):=\{(\tau,\omega):|\tilde{\alpha}(\tau,\omega)-\alpha|<\Delta_\alpha,|\tilde{\delta}(\tau,\omega)-\delta|<\Delta_\delta\} \tag{6}$$

where $\Delta_\alpha$ and $\Delta_\delta$ are the smoothing resolution widths, the two-dimensional smoothed weighted histogram can be constructed as:

$$H(\alpha,\delta):\iint_{(\tau,\omega)\in I(\alpha,\delta)}|\widehat{x_1}(\tau,\omega)\widehat{x_2}(\tau,\omega)|^p\omega^q d\tau d\omega \tag{7}$$

where, the X-axis is $$\frac{-1}{\omega}\angle\left(\frac{\widehat{x_2}(\tau,\omega)}{\widehat{x_1}(\tau,\omega)}\right),$$

which means the relative delay;

the Y-axis is $$\left[\frac{\widehat{x_2}(\tau,\omega)}{\widehat{x_1}(\tau,\omega)}\right]-\left[\frac{\widehat{x_1}(\tau,\omega)}{\widehat{x_2}(\tau,\omega)}\right],$$

which indicates the symmetric attenuation, and the Z-axis is H(α, δ), which represents the weighted value.

Figure 3:
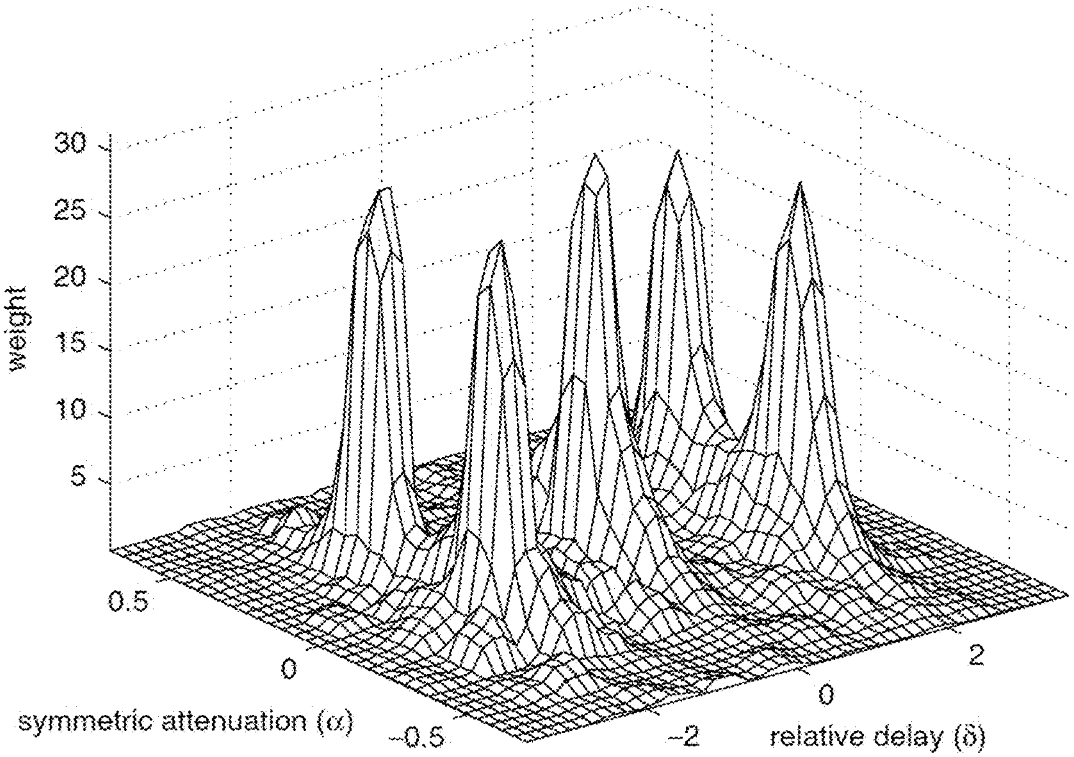
FIG. 3 is an example of the two-dimensional time-frequency feature image.

The two-dimensional smoothed weighted histogram separates and clusters the parameter estimates of each source. In the constructed weighted histogram, the number of peaks reveals the number of sources, and the peak locations reveal the associated source's anechoic mixing parameters. By way of example, a constructed weighted histogram is shown in FIG. 3, from which a constructed weighted histogram can be preliminarily determined that there are five sound sources existing in this measuring space.

Thus, the mixing parameter estimates can now be determined by locating peaks and peak centers in the subsystem 104 of FIG. 1.

It is notable that a topological approach is introduced in the invented system 100 for locating the precise locations of the peaks. According to the embodiment in FIG. 1, as already mentioned previously, the second subsystem 104 investigates the topological change structure of the two-dimensional smoothed weighted histogram to locating the peak locations. Here, the contour tree is constructed to capture the contour topology of the histogram.

Figure 4A:
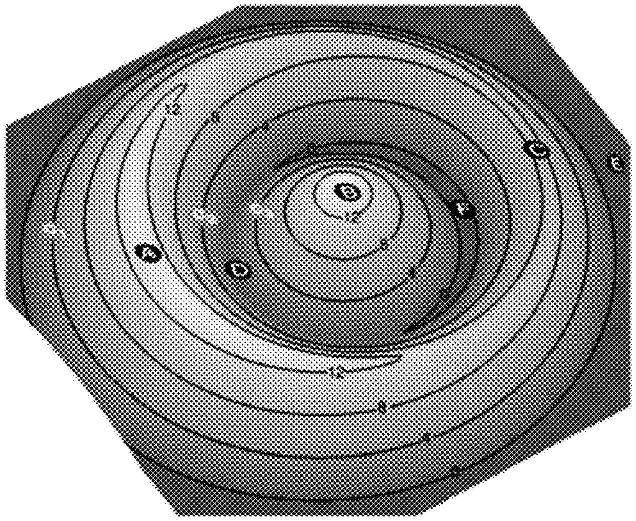
FIG. 4A-4B show an example of the contour tree construction according to the embodiment.
Figure 4B:
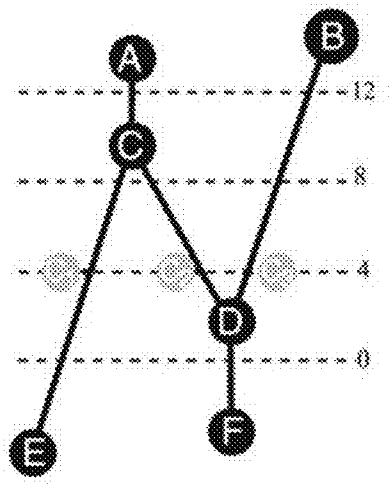

FIGS. 4A and 4B show an example of the process of the counter tree construction. Performing the topological analysis on the histogram as shown in FIG. 4A by the provided topological approach, its corresponding contour tree can be constructed as shown in FIG. 4B. The detail of constructing the contour tree is described hereinafter in refer to the process illustrated in FIG. 5.

Figure 5:
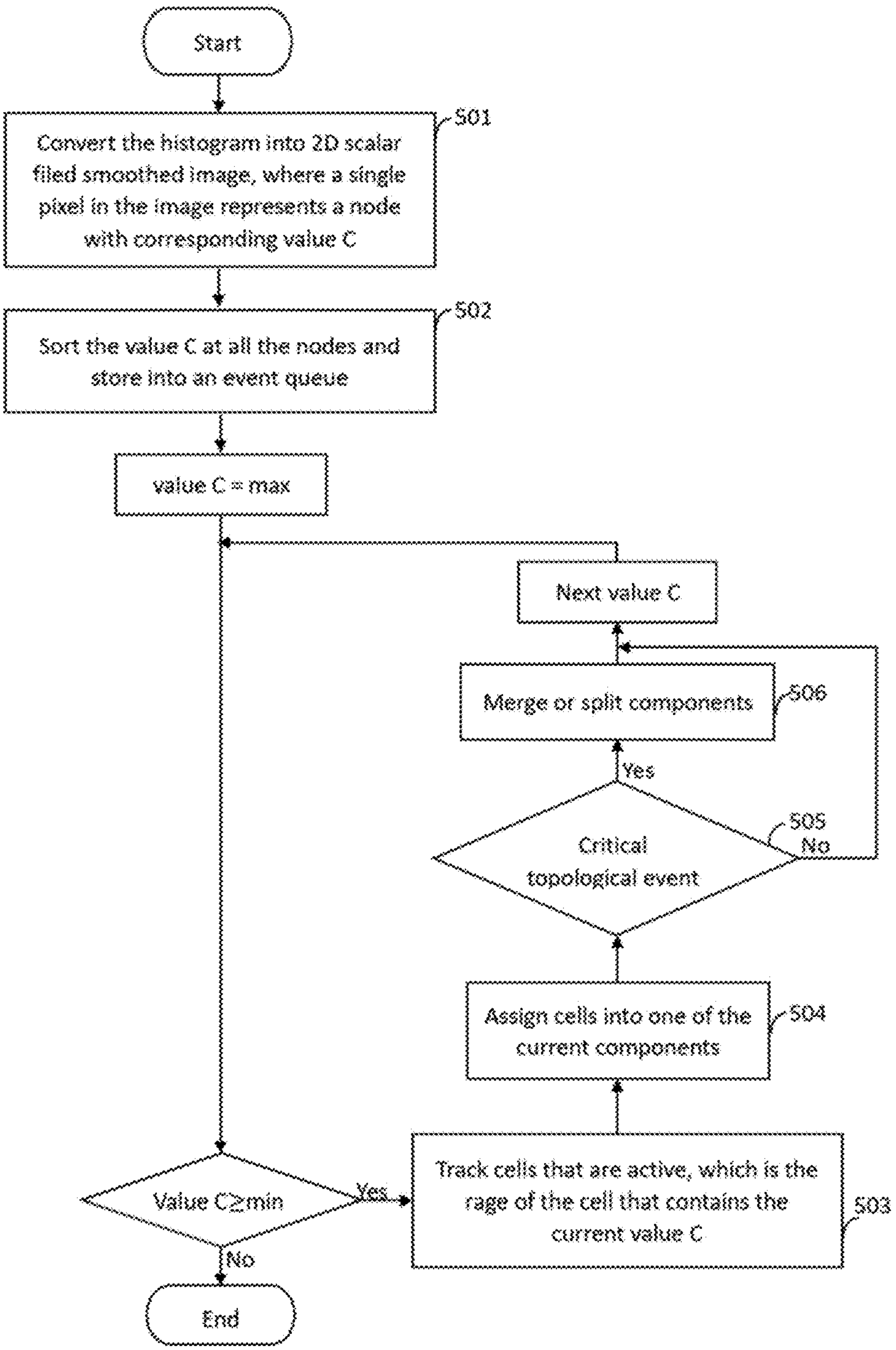
FIG. 5 is a flowchart illustrating the contour tree construction according to the embodiment.

FIG. 5 shows a flowchart illustrating the contour tree construction. The process starts and moves to the step 501, the histogram built is converted into the two-dimensional scalar field smooth image, where a single pixel in the image represents a node with a corresponding value C (an intensity value in the example of FIG. 4A, not shown).

Now in the step 502, the process sorts the value C at all the nodes and stores the sorted result in an event queue, which can be either from maxima to minima, or vice versa. Then the process scans the value C from the maxima to the minima in its value domain, and finds those nodes where the contour topology changes or gradient vanished. During scanning each of the values, the active cells are tracked, which refer to the range of the cell that includes the current value, as described in the step 503 in the flow chart of FIG. 5. A contour is formed by those nodes with the same intensity value. Accordingly, in the example, the contours including the values of 0, 4, 8, and 12 are depicted in FIG. 4A. The nodes where the contour topology changes or gradient vanished should have been stored, i.e., the nodes of A-F as described in FIG. 4A are stored.

In detail, when the contours change their mutual-inclusion relationship, the current node is stored as a critical topological event. As to the example of FIG. 4A, the contour component initiated from the node A splits into two contour components C1 and C2 when scanning met the node C. On the other hand, the contour component initiated from the node B merge with another contour component C2 initiated from the node C when scanning met node D. These stored nodes are connected using contour components. A new contour component starts to form when scanning to a node with local maxima of value C, and then its contour shape deforms continuously. An existing contour component disappears at the node with local minima value, i.e., the nodes E, F, in the example as shown in FIG. 4B.

In the step 504, after assigning the cells (the contours in the example) into one of the current components, the contour components merge or split at the critical topological events in the steps 505 and 506, and then the contour tree is constructed. In this example, the two contour components from B and C adjoin at the node D, and the contour component from A splits into two components at the node C. So far the tree structure representing of the topology of the histogram of FIG. 4A can be shown as in FIG. 5B. In practice, there are still some points or small pieces generated that do not belong to any point in nodes A-F. These points may be merged them into the nearby nodes A-F, or just remove them, in the later simplification steps.

Figure 6A:
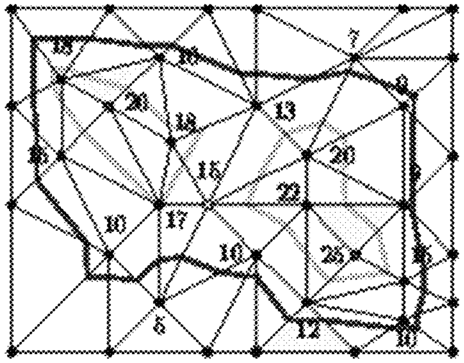
FIGS. 6A-6D show another example of the contour tree construction and simplification according to the embodiment.
Figure 6B:
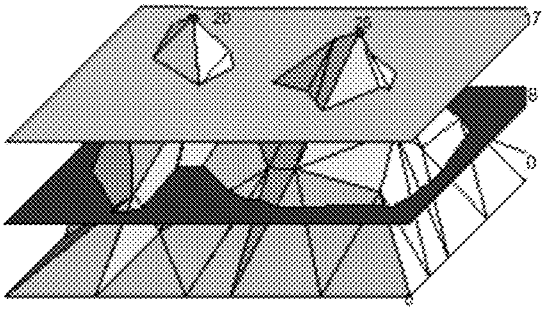
Figure 6C:
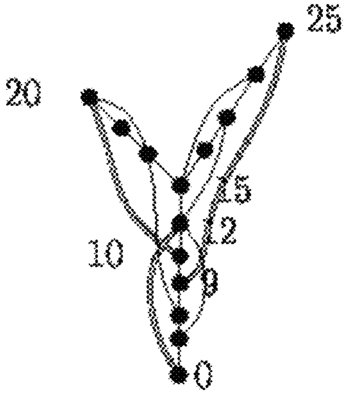
Figure 6D:
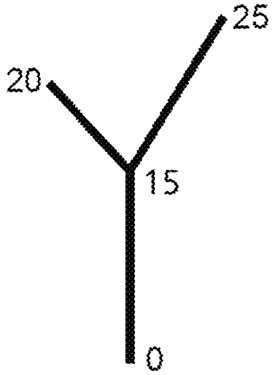

Another example of the contour tree construction is shown in FIGS. 6A to 6D. The two-dimensional scalar filed image in FIG. 6A is converted from the weighted histogram with two peaks as shown in FIG. 6B. As can be seen from the Figures, the two-dimensional scalar filed image has been represented in a computer using 2D meshes of irregular triangulation. The vertices of the triangulations each has a scalar value which is associated to the z-axis value in its un-converted histogram. By sorting the scalar values at all the vertices and scanning the value for its maxima to minima, it is possible to obtain and store at least the critical event nodes with value of 15, 20 and 25 by tracking active cells. For example, by tracking the active cell that includes value equivalent to the scalar value of 8, for example, during scanning the sorted values. we may obtain the large contour as shown in FIG. 6A. Similarly, by tracking the active cell when scanning the scalar value of 17, for example, we may obtain the upper two smaller contours in FIG. 6A. After connecting the contour components and assigning the active cells into each of the components, the contour tree as shown in FIG. 6C is construct and the contour components initiated from 20 and 25 are merged at the critical topological event 15. The contour tree can be further simplified by removing all the intermediate nodes in branches, as shown by FIGS. 6C-6D in the example.

Now the scalar field data that has been transformed from the histogram could be constructed into a tree-structured representation, where the top points of the branches that connected to the bottom can be determined as the peak of a cluster in the original histogram.

To make a contour-tree-based representation more robust to noise, a simple approach is provided to reduce the number of branches in the constructed contour tree, while preserving its topological properties.

Firstly, for each branch in the constructed contour tree, the disclosed embodiments locate the nodes in the other branches that is directly connected to a node in the branch. At that point, the nodes are merged that are directly connected and the intensity between the nodes is comparatively small. And then, trace from the branch that is located at the bottom of the constructed contour tree, visit all branches to collectively find the peak of the branches that is connected to the branch located at the bottom. Remove all other branches that is not connected to the path, which connects the peak to the bottom branch. Then remove all the intermediate nodes in such branches, in order to clean up unused nodes in the tree structure. Again, an example of the contour-tree-simplification process as described above can be seen referring to FIGS. 6C to 6D.

Optionally, it is possible to accumulate the area size during construction of contour tree and its simplification process, so that the traced branches would keep a property in its area size, which could also indicate the significance of the branch along with the depth of such branch.

In reference to the second subsystem 104 as disclosed in connection to FIG. 1, the second subsystem 104 has completed constructing the contour tree and simplifying the contour tree structure.

Figure 7A:
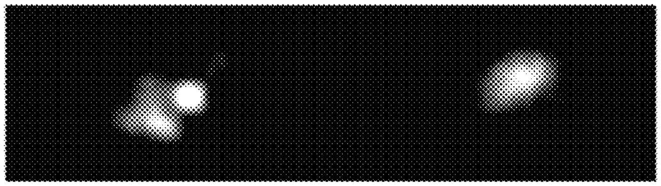
FIG. 7A is the experimental results for locating the peak locations in a two-dimension smooth weighted histogram to compare the contour tree construction algorithm according to the embodiment with the k-means algorithm.
Figure 7A:
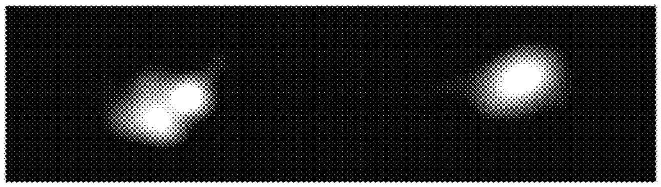

FIG. 7A shows two experimental results of the peak locations in a two-dimension smooth weighted histogram. The upper image of FIG. 7A locates the two peaks of the audio streams using the topological approach with constructing contour tree algorithm according to one embodiment, and the lower image of FIG. 7A locates the two peaks from the same audio streams with the k-means algorithm. Comparing the two experimental results of FIG. 7A, it can be seen that the topological based approach (as provided in the invented system) can locate the two peak points more precisely. The k-means based approach can get the estimated center of the clustered pixel with an additional smoothing step, but in contrast, the topological based approach in the disclosed system can not only find the location more accurately, but reproduce original method by omitting the smoothing step and being significantly faster.

Figure 7B:
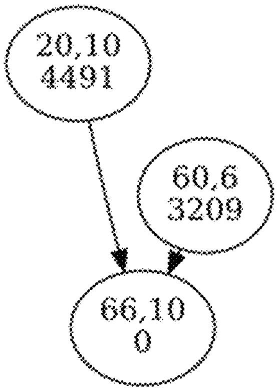
FIG. 7B is the contour tree constructed and simplified from the experimental results using the topologic approach of FIG. 7A.

FIG. 7B is the contour tree constructed and simplified from the above experimental result that uses the topologic approach in the upper FIG. 7A. The example of a contour tree with the two accurately located peaks and one roof node in a simplified structure. The coordinates of the peak locations in the histogram represent the mixing parameter pairs for each of the audio sources. In this example, the two peaks correspond to the coordinates of [20, 10, 4491] and [60, 6, 3209], respectively; and the roof node of the contour tree corresponds to the coordinate of [66, 10, 0] in its histogram. Because of the utilization of the precise locations of the peaks located using the topological approach algorithm instead of the k-means algorithm which predicts the cluster centers, the disclosed system using the topological approach is provided to be faster, and reliable, robust, and accurate in comparison to other alternatives.

FIG. 7B shows the comparation of experimental results for locating the peak locations in a two-dimension smooth weighted histogram with the same audio streams as in FIG. 7A by both the contour tree construction algorithm and the k-means algorithm. It can be seen from the Figure, the peak location using the contour tree algorithm is much accurate than that from the traditional k-means algorithm.

Finally, return back to FIG. 1, the third subsystem 105 separates the audio streams with the located peaks by constructing time-frequency binary masks for each peak center $(\tilde{\alpha}_j, \tilde{\delta}_j)$ as follow:

$$\tilde{M}_j(\tau, \omega) := \begin{cases} 1 & J(\tau, \omega) = j \\ 0 & \text{otherwise} \end{cases} \quad (8)$$

and applying the each of masks to the appropriately aligned mixtures, respectively, as follow:

$$\tilde{s}(\tau, \omega) = \tilde{M}_j(\tau, \omega)\left(\frac{\hat{x}_1(\tau, \omega) + \tilde{a}_j e^{i\tilde{\delta}_j\omega}\hat{x}_2(\tau, \omega)}{1 + \tilde{a}_j^2}\right) \quad (9)$$

By far each estimated source time-frequency representation has been partitioned into each one of the two peak centers, which may be converted back into the time domain to get the is separated audio stream 1, audio stream 2 . . . and audio stream N. As shown in FIG. 1, more than one loudspeaker may be used in the last stage to reproduce and playback the separated audio streams, respectively. Of cause, it shows that there are two audio streams separated by the system 100 and reproduced by two loudspeakers 106, 107 according to the embodiments disclosed herein.

It is notable that, specifically, the disclosed system provides for contour tree construction and simplification, and applies the algorithm in locating precise location of the peaks, instead of the cluster centers that are predicted by k-means algorithm in the traditional DUET algorithm. The topological approach is proved to be faster, reliable, robust and accurate in comparison to other alternatives.

After the weighted histogram separates and clusters the parameter estimates of each source. The number of peaks reveals the number of sources, and the peak locations reveal the associated source's anechoic mixing parameters.

The disclosed embodiments provide, for example, an efficient blind source separation using a topological approach and can be implemented in any system that includes more than one person talking at the same time. Referring to the experimental results shown in FIGS. 7A-7B, it may be possible to conclude that the disclosed system using the topological approach to improve the DUET algorithm for audio processing gains provides the following advantages:

- The disclosed system may be around 10 times faster than k-means algorithm for finding peak location in time-frequency space.
- The reliability of the DUET algorithm has been significantly improved. The disclosed system recovers the peak location in the time-frequency space using a topological approach, and this approach may not require any random value for initiation.
- The quality of the recovered audio has been improved. The disclosed system finds the peak locations of each cluster instead of center of such clusters, and thus improves the separated audio stream.
- The disclosed system may be robust in that the system may resist noises in a time-frequency space.

Therefore, the disclosed system is capable of demonstrating an improvement over original DUET in blind source separation (BSS) related real-life applications.

It is recognized that in one embodiment, a non-transitory computer-readable storage medium storing instructions that, when executed by a processor, configure the processor to perform receiving, in at least two microphones, mixtures comprising at least two mixed audio streams and converting, in a first subsystem, the mixtures to time-frequency space features, and constructing a two-dimensional smoothed weighted histogram. The non-transitory computer-readable storage medium storing instructions that, when executed by the processor, configure the processor to perform separating, in a second subsystem, the at least two mixed audio streams by locating peak locations in the two-dimensional smoothed weighted histogram to provide at least two separated audio streams; and recovering, in a third subsystem, the at least two separated audio streams, respectively. The locating the peak locations further comprises constructing a contour tree structure in the two-dimensional smoothed weighted histogram, and simplifying the contour tree structure.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects.

While exemplary embodiments are described above, it is not intended that these embodiments describe all possible forms of the present disclosure. Rather, the words used in the specification are words of description rather than limitation, and it is understood that various changes may be made without departing from the spirit and scope of the present disclosure. Additionally, the features of various implementing embodiments may be combined to form further embodiments of the present disclosure.

The invention claimed is:

1. A method for blind source separation using a topological approach, the method comprising:

receiving, in at least two microphones, mixtures comprising at least two mixed audio streams;

converting, in a first subsystem, the mixtures to time-frequency space features, and constructing a two-dimensional smoothed weighted histogram;

separating, in a second subsystem, the at least two mixed audio streams by locating peak locations in the two-dimensional smoothed weighted histogram to provide at least two separated audio streams; and recovering, in a third subsystem, the at least two separated audio streams, respectively, wherein locating the peak locations further comprises the steps of:

constructing a contour tree structure in the two-dimensional smoothed weighted histogram; and simplifying the contour tree structure.

2. The method of claim 1, wherein converting the mixtures to the time-frequency space features comprises providing a relative attenuation-delay estimates of attenuation and delay parameters, a relative attenuation factor, and an arrival delay.

3. The method of claim 1, wherein converting the mixtures to the time-frequency space features further comprises clustering relative attenuation-delay estimates.

4. The method of claim 3, wherein clustering the relative attenuation-delay estimates further comprises clustering the relative attenuation-delay estimates with maximum likelihood estimators.

5. The method of claim 1, wherein constructing the contour tree structure further comprises:

converting the two-dimensional smoothed weighted histogram into a two-dimensional scalar field image, where a single pixel in the image represents a node corresponding to a scalar value;

sorting the scalar values at all the nodes and storing into an event queue;

scanning the sorted scalar values from a maxima to a minima in a domain; and tracking cells that are active formed with nodes of a same scalar value being scanned.

6. The method of claim 5, wherein tracking the cells that are active further comprising:

assigning the cells into contour components; and merging or splitting the contour components at critical topological events.

7. The method of claim 1, wherein simplifying the contour tree structure further comprising:

for each branch in the constructed contour tree structure, searching for nodes in other branches that is directly connected to a node in the branch, and merging the nodes that are directly connected and an intensity between the nodes are comparatively small; and tracing from the branch that is located at a bottom of the constructed contour tree structure, visiting all branches to collectively locate a peak of the branches that is connected to the branch located at a bottom removing all other branches that connects the peak to the bottom branch, and then removing all intermediate nodes to clean up unused nodes in the contour tree structure.

8. The method of claim 1, wherein recovering a first separated audio stream and a second separated audio stream from the at least two separated audio streams further comprising:

constructing time-frequency binary masks for each peak center;

applying each mask to approximately aligned mixtures; and converting each estimated source time-frequency representation back into a time domain.

9. The method of claim 1 further comprising converting and playing back the recovered the at least two separated audio streams in at least two loudspeakers, respectively.

10. A system for blind source separation using a topological approach, comprising:

at least two microphones for receiving mixtures comprising at least two mixed audio streams;

a first subsystem for converting the mixtures to time-frequency space features, and constructing a two-dimensional smoothed weighted histogram;

a second subsystem for separating the at least two mixed audio streams by locating peak locations in the two-dimensional smoothed weighted histogram to provide at least two separated audio streams; and a third subsystem for recovering the at least two separated audio streams, respectively, wherein locating the peak locations in the second subsystem further comprises:

constructing a contour tree structure in the two-dimensional smoothed weighted histogram; and simplifying the contour tree structure.

11. The system of claim 10, wherein converting the mixtures to the time-frequency space features comprises providing a relative attenuation-delay estimates of attenuation and delay parameters, a relative attenuation factor, and an arrival delay.

12. The system of claim 10, wherein converting the mixtures to the time-frequency space features further comprises clustering relative attenuation-delay estimates.

13. The system of claim 12, wherein clustering the relative attenuation-delay estimates further comprises clustering the relative attenuation-delay estimates with maximum likelihood estimators.

14. The system of claim 10, wherein constructing the contour tree structure further comprising:

converting the two-dimensional smoothed weighted histogram into a two-dimensional scalar field image, where a single pixel in the image represents a node corresponding to a scalar value;

sorting the scalar values at all nodes and storing into an event queue;

scanning the sorted scalar values from a maxima to a minima in a domain; and tracking cells that are active formed with nodes of the scalar value being scanned.

15. The system of claim 14, wherein tracking the cells that are active further comprising:

assigning the cells into contour components; and merging or splitting the contour components at critical topological events.

16. The system of claim 10, wherein simplifying the contour tree structures further comprising:

for each branch in the constructed contour tree structure, searching for nodes in the other branches that is directly connected to a node in the branch, and merging the nodes that are directly connected and an intensity between the nodes are comparatively small; and tracing from the branch that is located at the bottom of the constructed contour tree, visiting all branches to collectively locate a peak of the branches that is connected to the branch located at the bottom, removing all other branches that connects the peak to the bottom branch, and then removing all intermediate nodes to clean up unused nodes in the tree structure.

17. The system of claim 10, wherein recovering a first separated audio stream and a second separated audio stream from the at least two separated audio streams further comprising:

constructing time-frequency binary masks for each peak center;

applying each mask to approximately aligned mixtures; and converting each estimated source time-frequency representation back into a time domain.

18. The system of claim 10 further comprising at least two loudspeakers for playing back the recovered at least two separated audio streams, respectively.

19. A non-transitory computer-readable storage medium storing instructions that, when executed by a processor, configure the processor to perform:

receiving, in at least two microphones, mixtures comprising at least two mixed audio streams;

converting, in a first subsystem, the mixtures to time-frequency space features, and constructing a two-dimensional smoothed weighted histogram;

separating, in a second subsystem, the at least two mixed audio streams by locating peak locations in the two-dimensional smoothed weighted histogram to provide at least two separated audio streams; and recovering, in a third subsystem, the at least two separated audio streams, respectively, wherein locating the peak locations further comprises:

constructing a contour tree structure in the two-dimensional smoothed weighted histogram; and simplifying the contour tree structure.

20. The computer readable storage medium of claim 19, wherein converting the mixtures to the time-frequency space features further comprises clustering relative attenuation-delay estimates.

* * * * *